N. L. WILLIAMS.
WATER GAGE.
APPLICATION FILED MAY 18, 1914.
1,180,811.
Patented Apr. 25, 1916.
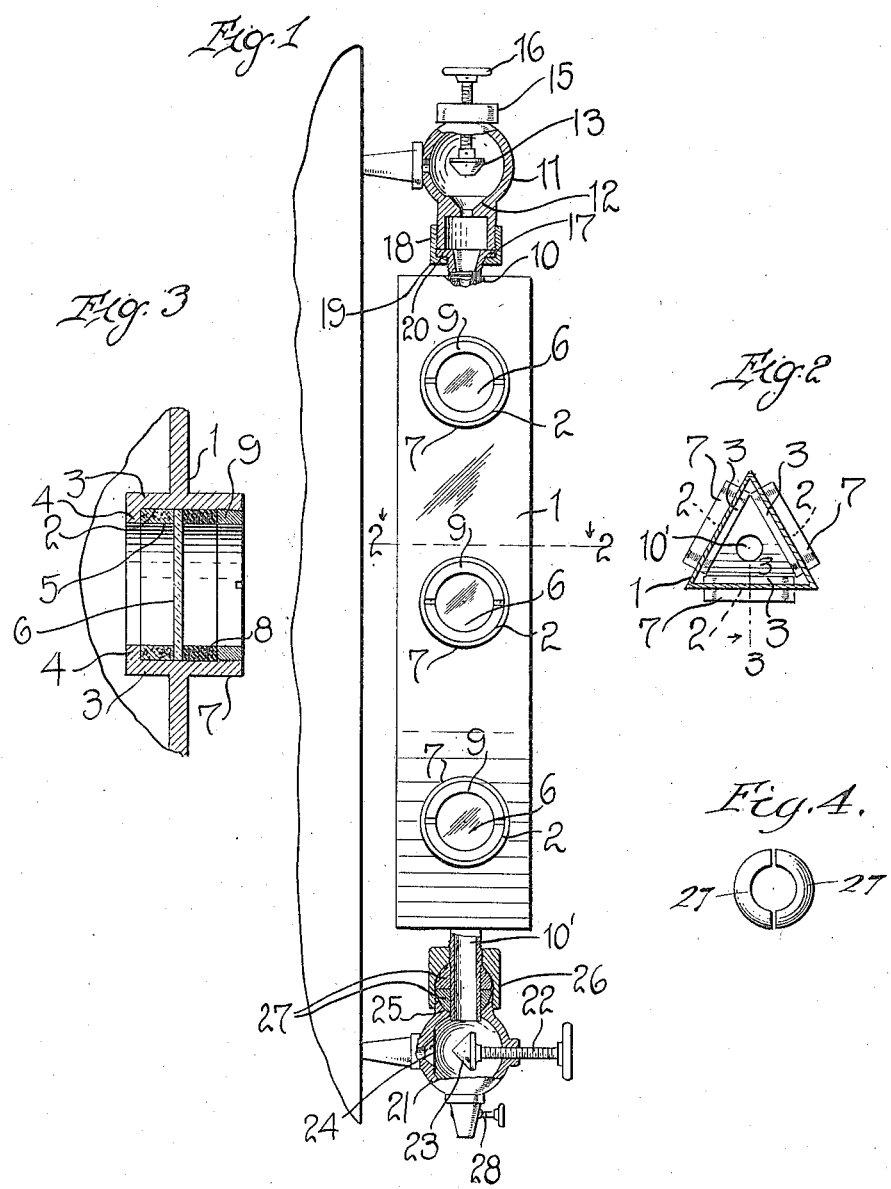

UNITED STATES PATENT OFFICE.

NORBORNE L. WILLIAMS, OF SAYRE, OKLAHOMA.

WATER-GAGE.

1,180,811.  Specification of Letters Patent.  Patented Apr. 25, 1916.

Application filed May 18, 1914.  Serial No. 839,405.

*To all whom it may concern:*

Be it known that I, NORBORNE L. WILLIAMS, a citizen of the United States, residing at Sayre, in the county of Beckham and State of Oklahoma, have invented certain new and useful Improvements in Water-Gages, of which the following is a specification, reference being had to the accompanying drawings.

This invention relates to new and useful improvements in water gages and more particularly to a water gage adapted for use upon steam boilers and the like, the main object of the present invention being the provision of a water gage adapted to be applied to the front end of a boiler and preferably adapted to be used upon locomotive boilers, the construction being such that the water contained within the gage will be visible to both the engineer and the fireman.

Another object of the present invention is the provision of a water gage of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is an elevation of a water gage constructed in accordance with my invention. Fig. 2 is a transverse sectional view taken on the line 2—2, Fig. 1; and Fig. 3 is an enlarged sectional view taken on the line 3—3, Fig. 2. Fig. 4 is a detail view of the gaskets 27.

Referring more particularly to the drawing, 1 indicates the body of a water gage which is preferably triangular in cross section and formed of metal or other suitable material. The side walls of the body 1 are provided with spaced openings 2 and extending inwardly upon the inner side of the body, around each opening, is a flange 3, having an annular flange 4 formed upon its inner end to form a seat for a fiber gasket 5. Arranged within the openings 2 and bearing upon the gasket 5, is a glass 6, whereby to close the openings 2 so that the water within the gage will be plainly visible from the outside. Extending outwardly from the outer wall of the body 1, is a flange 7 which is preferably annular in form and arranged within the flange is a rubber gasket 8 which is adapted to bear against the glass 6 to retain the same in position.

The rubber gasket 8 is securely held in position by means of a skeleton nut 9 which is removably mounted within the flange 7 and adapted to bear against the gasket to hold the same and the glass 6 in position. It will be understood that the inner face of the flange 7 and the outer face of the gasket 8 is preferably screw threaded so that they may be quickly and readily engaged or disengaged. It will be noted that by having the glass members 6 arranged between the gaskets 5 and 8, it will bring the same into longitudinal alinement with the wall of the body of the gage and by having the flange 7 extending outwardly from the wall, it will provide a protecting ring for the glass, so that the same will not be readily broken by objects striking against the outer side of the gage. The ends of the body 1 are provided with central openings 10 and 10' and mounted at the upper end of the body of the water gage and connecting with the opening 10 is a steam valve casing 11 having a valve seat 12 and a movable valve 13, said valve having a stem 14 which extends upwardly through the upper end of the valve and is held in place by means of a removable cap 15, said valve stem having a hand wheel 16 formed upon its upper end, whereby the valve 13 may be readily seated or unseated, it being understood that the valve or stem 14 is adjustably mounted within the central portion of the cap 15.

Arranged within the opening 10, at the upper end of the body 1, is a collar 17, the lower end of which is provided with screw threads, whereby it may be readily engaged with the threads of the opening 10, said collar being provided at its upper end with an out-turned flange 20 adapted to be disposed within the sleeve 18 and engaged with the inturned flange 19 formed upon the lower edge of the sleeve 18. The upper end of the sleeve 18 is provided with screw threads adapted to be removably connected with the lower end of the valve 11, whereby to provide for a direct communication between the body 1 and the valve 11. Connected with the lower end of the body 1, is a water valve 21 which is provided with a horizontally disposed reciprocating valve stem 22 having a valve 23 upon its inner end adapted to be seated upon the valve seat 24. The lower end of the body 1, is formed substantially tubular and extends into the upper end of the valve member 21. The upper end of the valve 21 is provided with a concaved seat 25 and threaded on the upper end of the valve is a sleeve 26 which is mounted upon the lower tubular end of the body 1. The interior of the sleeve 26 at its upper end is formed with a concave face complemental to the concave face of the upper end of the valve casing 21. Disposed within the sleeve or member 26 are the packing members 27, there being two pairs of these members, each of the members being semi-circular in form. These members are each approximately triangular in cross section, the outer faces of the members being convex so that when the valve casing is screwed into the sleeve 26 the packing members will conform to the curvature of the upper end of the sleeve and the upper end of the valve casing and will form a water tight joint. This construction permits the gage glass to be readily swung outward at its upper end when the union 18 is disengaged from the valve casing 11 and the union 26 is disengaged from the valve casing 21. In other words, the construction described provides a packed universal joint between the lower end of the tubular stem 10' and valve casing 21 which permits of an oscillation of the gage glass so that it may be readily removed.

From the above it will be apparent that the valves 13 and 21 are normally arranged in an open position, so that when the boiler is filled, the gage will register the amount of water contained within the boiler. It will be apparent that by forming the body 1 of metal and providing the same with openings having transparent material arranged thereover, it will eliminate the danger of breaking the water gage and by forming the body substantially triangular in shape, it will be apparent that the same may be readily visible from different points. Arranged at the lower end of the valve member 21, is a drain valve 28, whereby the body 1 may be readily drained of its contents when desired. It is generally necessary to drain the body quite often to prevent settlings collecting therein and stopping up the valve members. It will be apparent that my improved water gage may be quickly and readily applied to any well known form of steam boiler and is so constructed and arranged that it may be visible from various points. It will also be apparent that the same is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention as defined by the appended claims.

Having thus described this invention, what I claim is:—

1. A device of the class described including a hollow body, having a tubular stem projecting from one end, a cap nut secured to said stem and interiorly screw threaded, a valve body having exterior screw threads engaging in said cap nut and having an opening into which said stem passes, and two pairs of semi-circular packing rings, each pair being arranged to surround the stem, said packing rings being each approximately triangular in cross section, the flat faces of the packing rings bearing against each other, the inclined outer faces of the packing rings bearing against the upper faces of the cap nut and against a seat formed in the valve body surrounding the central opening.

2. In a water gage, a hollow metallic many sided body each side wall of which has a plurality of spaced openings, each opening being defined by an integral wall extending out beyond the plane of the face of the body and inwardly extending into the body, said walls being spaced from each other and the inwardly extending wall having a seating flange at its inner end, a gasket disposed within each wall against the seating flange, a transparent disk arranged within the wall and bearing against the gasket, a gasket disposed upon the outer face of each of said disks, and a removable locking ring having screw-threaded engagement with the outer end of each wall and bearing against said gasket to removably retain the disk in position whereby to permit the independent removal of any one of said disks and its replacement.

In testimony whereof I hereunto affix my signature in the presence of two witnesses.

NORBORNE L. WILLIAMS.

Witneses:
W. B. MABERY,
N. K. WILLIAMS.

Copies of this patent may be obtained for five cents each, by addressing the "Commissioner of Patents, Washington, D. C."